(12) United States Patent
Gao et al.

(10) Patent No.: US 9,490,949 B2
(45) Date of Patent: Nov. 8, 2016

(54) PILOT RESOURCE ALLOCATION METHOD AND DEVICE

(71) Applicant: HUAWEI TECHNOLOGIES CO., LTD., Shenzhen, Guangdong (CN)

(72) Inventors: Chi Gao, Shenzhen (CN); Mingyu Zhou, Beijing (CN); Liang Xia, Beijing (CN); Qiang Wu, Beijing (CN); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 145 days.

(21) Appl. No.: 14/319,366

(22) Filed: Jun. 30, 2014

(65) Prior Publication Data

US 2014/0314018 A1    Oct. 23, 2014

Related U.S. Application Data

(63) Continuation of application No. PCT/CN2012/076750, filed on Jun. 12, 2012.

(30) Foreign Application Priority Data

Dec. 31, 2011    (CN) .......................... 2011 1 0459080

(51) Int. Cl.
  *H04L 5/00* (2006.01)
  *H04W 72/04* (2009.01)
(52) U.S. Cl.
  CPC ........... *H04L 5/0048* (2013.01); *H04L 5/0051* (2013.01); *H04W 72/042* (2013.01)
(58) Field of Classification Search
  CPC . H04L 5/0048; H04L 5/0051; H04W 72/042
  See application file for complete search history.

(56) References Cited

U.S. PATENT DOCUMENTS

2013/0121273 A1*  5/2013  Kim .................... H04W 72/042
                                    370/329

FOREIGN PATENT DOCUMENTS

CN      102118864       7/2011
WO      2011/132988    10/2011

OTHER PUBLICATIONS

European Office Action issued Nov. 3, 2015 in corresponding European Patent Application No. 12 863 807.9.
"Further Discussions on DMRS-Based E-PDCCH Transmission", Samsung, Agenda Item 7.6.1, 3GPP TSG RAN WG1 #68bis, Jeju, Korea, Mar. 26-30, 2012, R1-121641, pp. 1-7.
*DM-RS Layer Mapping and Control Signallling*, 3GPP TSG RAN WG1 Meeting #61, R1-103183, Montreal, Canada, May 10-14, 2010, pp. 1-6.

(Continued)

*Primary Examiner* — Pao Sinkantarakorn
(74) *Attorney, Agent, or Firm* — Staas & Halsey LLP

(57) ABSTRACT

Various embodiments of the present invention provide a pilot resource allocation method, where the method includes: determining, according to an aggregation level and multiplexing information of an enhanced control channel element E-CCE in a resource block pair, the number of resource elements REs that are allocated to and occupied by a demodulation pilot signal DMRS in the resource block pair. Various embodiments of the present invention further provide a corresponding user equipment. By implementing the method and device, the efficiency of time-frequency resource utilization can be improved.

18 Claims, 6 Drawing Sheets

S100

Determine, according to an aggregation level and multiplexing information of an enhanced control channel element E-CCE in a resource block pair, the number of resource elements REs that are allocated to and occupied by a demodulation pilot signal DMRS in the resource block pair

(56) References Cited

OTHER PUBLICATIONS

*Analysis of DCI Multiplexing in ePDCCH Design*, 3GPP TSG RAN WG1 Meeting #67, R1-113950, San Francisco, CA, Nov. 14-18, 2011 (5 pp.).

*E-PDCCH Transmission with DMRS as Demodulation RS*, 3GPP TSG RAN WG1 Meeting #67, R1-1193958, San Francisco, CA, Nov. 14-18, 2011, pp. 1-4.
International Search Report, dated Oct. 18, 2012, in corresponding International Application No. PCT/CN2012/076750 (10 pp.).
Extended European Search Report, dated Dec. 20, 2013, in corresponding European Application No. 12863807.9 (9 pp.).

\* cited by examiner

S100

Determine, according to an aggregation level and multiplexing information of an enhanced control channel element E-CCE in a resource block pair, the number of resource elements REs that are allocated to and occupied by a demodulation pilot signal DMRS in the resource block pair

FIG. 1

PILOT RESOURCE ALLOCATION METHOD AND DEVICE

CROSS-REFERENCE TO RELATED APPLICATIONS

This application is a continuation of International Application No. PCT/CN2012/076750, filed on Jun. 12, 2012, which claims priority to Chinese Patent Application No. 201110459080.3, filed on Dec. 31, 2011, both of which are hereby incorporated by reference in their entireties.

FIELD OF THE INVENTION

The present invention relates to the field of communications, and in particular, to a pilot resource allocation method and device.

BACKGROUND OF THE INVENTION

In downlink transmission of a long term evolution (Long Term Evolution, LTE) Release 8/9/10 communication system, an evolved base station (Evolved Node B, eNB) sends a physical downlink shared channel (Physical Downlink Shared Channel, PDSCH) and a corresponding physical downlink control channel (Physical Downlink Control Channel, PDCCH) for each scheduled user equipment (User Equipment, UE) according to a scheduling result, where the PDSCH bears data sent to the scheduled user equipment UE by the eNB, and the PDCCH bears scheduling information of its corresponding PDSCH. The scheduling information is mainly used for indicating transmission format information of its corresponding PDSCH, which includes resource allocation, the size of a transmission block, a modulation and coding manner, a transmission rank and pre-coding matrix information, and so on. The PDCCH and PDSCH are multiplexed into one subframe through a time-division multiplexing. For a general cyclic prefix, each subframe includes two slots (slot), there are seven orthogonal frequency division multiplexing (Orthogonal Frequency Division Multiplexing, OFDM) symbols in each slot, where the PDCCH is transmitted in the first n (n=1, 2, 3, 4) OFDM symbols of the first slot, n is dynamic and variable and the remaining OFDM symbols are used for transmitting the PDSCH.

In one subframe, PDCCHs of all scheduled user equipments UEs are multiplexed together and then sent in a PDCCH region. Each PDCCH consists of 1/2/4/8 control channel elements (Control Channel Element, CCE), where the number of CCEs consisted in each PDCCH is determined by the size of the PDCCH and a channel of the user equipment corresponding to the PDCCH. The number of CCEs consisted in each PDCCH of the user equipment may be different.

Due to introduction of technologies such as multiple input multiple output (Multiple Input Multiple Output, MIMO) in the subsequent evolution of the LTE, the number of user equipments scheduled at the same time is increased. However, an existing PDCCH limits the number of user equipments that can be scheduled by one subframe. In order to improve the capacity of the PDCCH, an enhanced PDCCH (Enhanced Physical Downlink Control Channel, E-PDCCH) is introduced. Resource scheduling is performed on the E-PDCCH in a frequency domain resource of the LTE with a resource block pair (Resource Block pair, RB pair) as a unit. Each RB pair occupies 12 subcarriers in a frequency domain and occupies one subframe in a time domain. An available resource of the E-PDCCH is a resource element (Resource Element, RE) except a PDCCH domain and resource elements that occupied by various pilot symbols (Reference Signals, RSs) in each RB pair, where the RS includes a demodulation pilot symbol (Demodulation Reference Signal, DMRS), a cell pilot signal (Cell-specific Reference Signal, CRS) and a channel state indication pilot symbol (Channel State Information-Reference Signal, CSI-RS). In an enhanced PDCCH domain, each E-PDCCH consists of an aggregated E-CCE logic element similar to a CCE. One RB pair may contain multiple E-CCE elements, where the multiple E-CCE elements may be E-CCEs belonging to one E-PDCCH and may also be E-CCEs belonging to multiple E-PDCCHs. The E-CCEs belonging to the same E-PDCCH may be transmitted by using the same antenna port (port), and the E-CCEs belonging to different E-PDCCHs needs to be transmitted by using different ports. In other words, the number of antenna ports used by an RB pair is undetermined. Due to existence of the foregoing situation, the number of ports that are actually used in each RB pair cannot be accurately determined, so the number of REs that are actually used by a DMRS cannot be determined and decoding cannot be performed. In the prior art, no matter what the number of REs that are actually occupied by the DMRS is, both a base station and a user assume that the maximum possible number of REs are occupied by the DMRS, but the manner of always assuming that the maximum possible number of REs are occupied by the DMRS results in that an RE that is not actually used by the DMRS is idle, thereby reducing the utilization of a frequency domain resource.

SUMMARY OF THE INVENTION

Embodiments of the present invention provide a pilot resource allocation method and device. The number of REs occupied by a DMRS is allocated according to a multiplexing situation of an E-CCE and an aggregation level of the E-CCE, and resource allocation is performed by using correspondence between the aggregation level of the E-CCE and the number of REs occupied by the DMRS, so that E-CCEs of different aggregation levels corresponds to different numbers of REs of DRMSs, rather than that the number of REs is uniformly set to the maximum value, thereby improving the efficiency of time-frequency resource utilization.

According to a first aspect of the present invention, a pilot resource allocation method is provided, including:

determining, according to an aggregation level and multiplexing information of an enhanced control channel element E-CCE in a resource block pair, the number of resource elements REs that are allocated to and occupied by a demodulation pilot signal DMRS in the resource block pair.

According to a second aspect of the present invention, a user equipment is provided, including:

an allocation unit, configured to determine, according to an aggregation level and multiplexing information of an enhanced control channel element E-CCE in a resource block pair, the number of resource elements REs that are allocated to and occupied by a demodulation pilot signal DMRS in the resource block pair.

According to a third aspect of the present invention, a base station is provided, including:

an allocation unit, configured to determine, according to an aggregation level and multiplexing information of an enhanced control channel element E-CCE in a resource block pair, the number of resource elements REs that are allocated to and occupied by a demodulation pilot signal DMRS in the resource block pair.

Implementing the embodiments of the present invention has the following beneficial effects: resource allocation is performed by using the correspondence between the aggregation level of the E-CCE and the number of REs occupied by the DMRS, so that the efficiency of time-frequency resource utilization is improved.

BRIEF DESCRIPTION OF THE DRAWINGS

To describe the technical solutions in the embodiments of the present invention or in the prior art more clearly, the following briefly introduces accompanying drawings required for describing the embodiments. Apparently, the accompanying drawings in the following description show merely some embodiments of the present invention, and persons of ordinary skill in the art may still derive other drawings from the accompanying drawings without creative efforts.

FIG. 1 shows a schematic diagram of a pilot resource allocation method according to an implementation manner of the present invention;

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Referring to FIG. 1, FIG. 1 shows a schematic diagram of a pilot resource allocation method according to an implementation manner of the present invention, where the method may specifically include:

S100: Determine, according to an aggregation level and multiplexing information of an enhanced control channel element E-CCE in a resource block pair, the number of resource elements RE that are allocated to and occupied by a demodulation pilot signal DMRS in the resource block pair.

In an implementation manner of the present invention, resource allocation may be performed by a base station, and may also be performed by a user equipment UE in communication with the base station. In the implementation manner of the present invention, resource allocation correspondence used by the base station and that used by the UE are consistent. In other words, in the implementation manner of the present invention, correspondence between the aggregation level of the enhanced control channel element (Enhanced Control Channel Element, E-CCE) E-CCE and the number of REs allocated to the DMRS in the resource block pair is known by both the base station and the UE. According to a aggregation level and multiplexing information of an enhanced control channel element E-CCE in one resource block pair (RB pair), the number of REs that are allocated to and occupied by the demodulation pilot signal DMRS in the resource block pair RB pair is determined, and correspondence between the aggregation level of the E-CCE and the number of REs occupied by the DMRS may be established. For different aggregation levels of the E-CCE, different numbers of REs are allocated to the DMRS, rather than the maximum number of REs is uniformly allocated, thereby reducing the idleness of an RE that is not used by the DMRS, and improving the efficiency of resource utilization.

Figure 2:
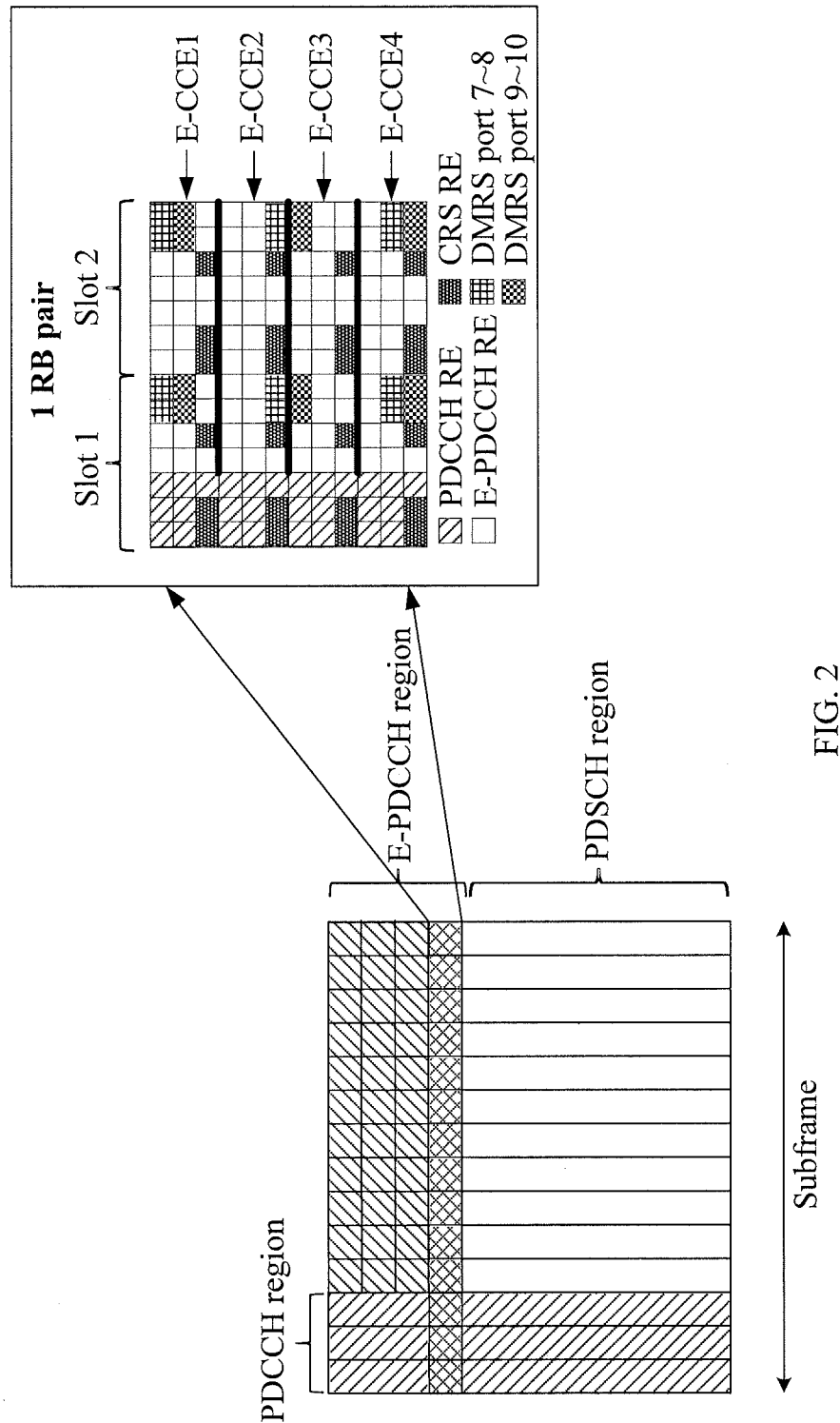
FIG. 2 shows a first schematic diagram of pilot resource allocation according to an implementation manner of the present invention.

In some implementation manners of the present invention, each E-CCE of an enhanced physical downlink control channel E-PDCCH is transmitted by using one antenna port, the number of E-CCEs in one RB pair is 4, and reference may be made to FIG. 2 for specific resource allocation. In FIG. 2, different forms of blocks are used for identifying REs occupied by a PDCCH, the E-PDCCH, a CRS, DMRS port 7 to port 8 and DMRS port 9 to port 10 respectively. In a case that one antenna port is used for transmission, the correspondence between the aggregation level of the E-CCE and the number of REs occupied by the DRMS in one RB pair is shown in Table 1.

TABLE 1

| Aggregation level | Number of REs |
| --- | --- |
| 1 | 24 |
| 2 | 24 |
| 4 | 12 |
| 8 | 12 |

Figure 3:
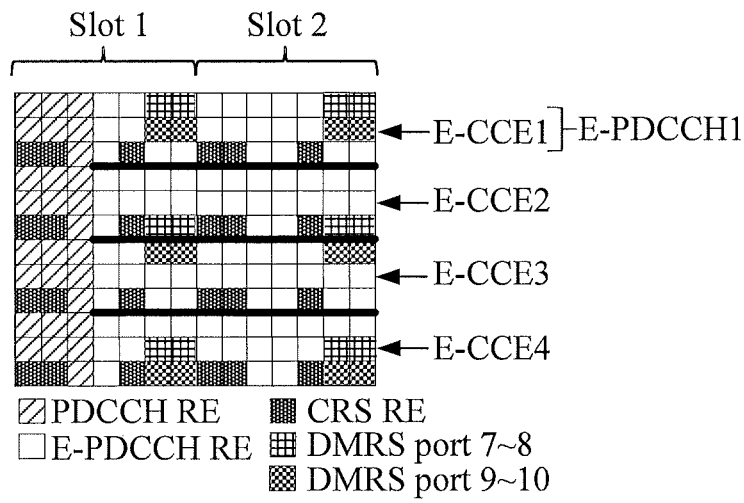
FIG. 3 shows a second schematic diagram of pilot resource allocation according to an implementation manner of the present invention.

In some implementation manners, each E-CCE is transmitted by using one antenna port. When the aggregation level of the enhanced control channel element E-CCE is 1, it is assumed that the position of E-CCE1 in one RB pair is occupied, as shown in FIG. 3. During receiving, the user equipment cannot determine how many E-PDCCHs are transmitted in positions of remaining E-CCEs (number of the remaining E-CCEs=total number of E-CCEs in one RB pair−aggregation level, where "−" is the mathematical operation symbol minus sign), that is, positions of E-CCE2 to E-CCE4, and assumes that the largest number of E-PDCCHs are transmitted, the largest number is 3, that is, E-CCE2 to E-CCE4 belong to three different E-PDCCHs and need to be transmitted by using three ports. The total number of antenna ports used in the RB pair is 4. Assuming that the used ports are port 7 to port 10, as shown in FIG. 3, the number of REs occupied by the ports port 7 to port 10 is 24, so it is determined that the number of REs to be allocated to the DMRS is 24.

Figure 4:
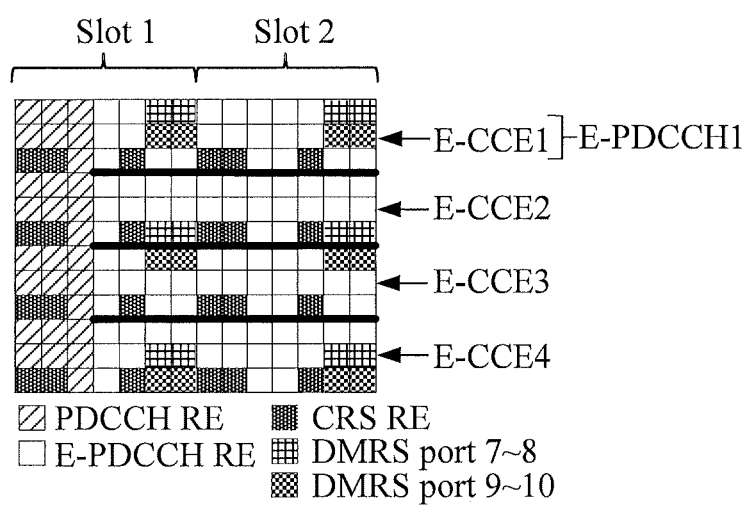
FIG. 4 shows a third schematic diagram of pilot resource allocation according to an implementation manner of the present invention.

In some implementation manners, each E-CCE is transmitted by using one antenna port. When the aggregation level of the enhanced control channel element E-CCE is 2, assuming that positions of E-CCE1 to E-CCE2 in one RB pair are occupied, as shown in FIG. 4. During receiving, the user equipment cannot determine whether positions of the remaining E-CCE3 to E-CCE4 transmit one or two E-PDCCHs, and assumes that the two E-PDCCHs are transmitted at most, so the total number of antenna ports used in the resource block pair is 3. Assuming that ports port 7 to port 9 are used, the number of REs occupied by the ports port 7 to port 9 is 24, so it can be determined that the number of REs to be allocated to the DMRS is 24.

Figure 5:
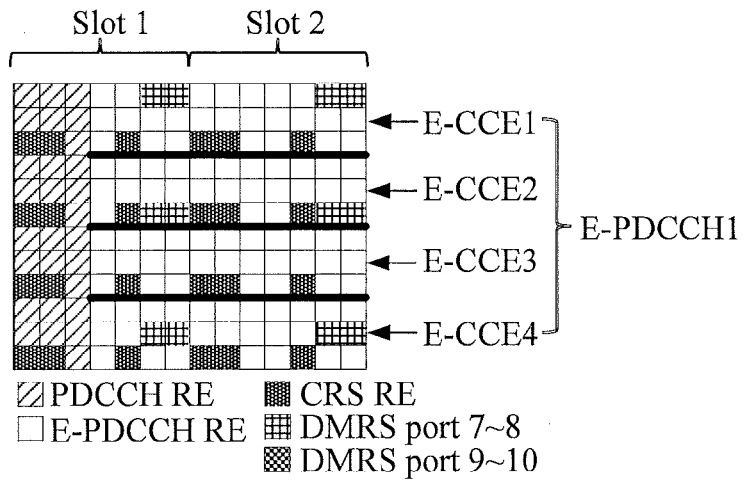
FIG. 5 shows a fourth schematic diagram of pilot resource allocation according to an implementation manner of the present invention.

In some implementation manners, each E-CCE is transmitted by using one antenna port. When the aggregation level of the enhanced control channel element E-CCE is 4, assuming that E-CCE1 to E-CCE4 in one RB pair are occupied, as shown in FIG. 5, in this case, the total number of E-CCEs in the resource block pair is equal to the aggregation level of the E-CCE. That is, all the E-CCEs in the resource block pair belong to the same E-PDCCH, and the number of antenna ports used by the resource block pair is 1. Assuming that the port port 7 is used, and the number of REs occupied by ports port 7 to port 8 is 12, so it is determined that the number of REs to be allocated to the DMRS is 12.

Figure 6:
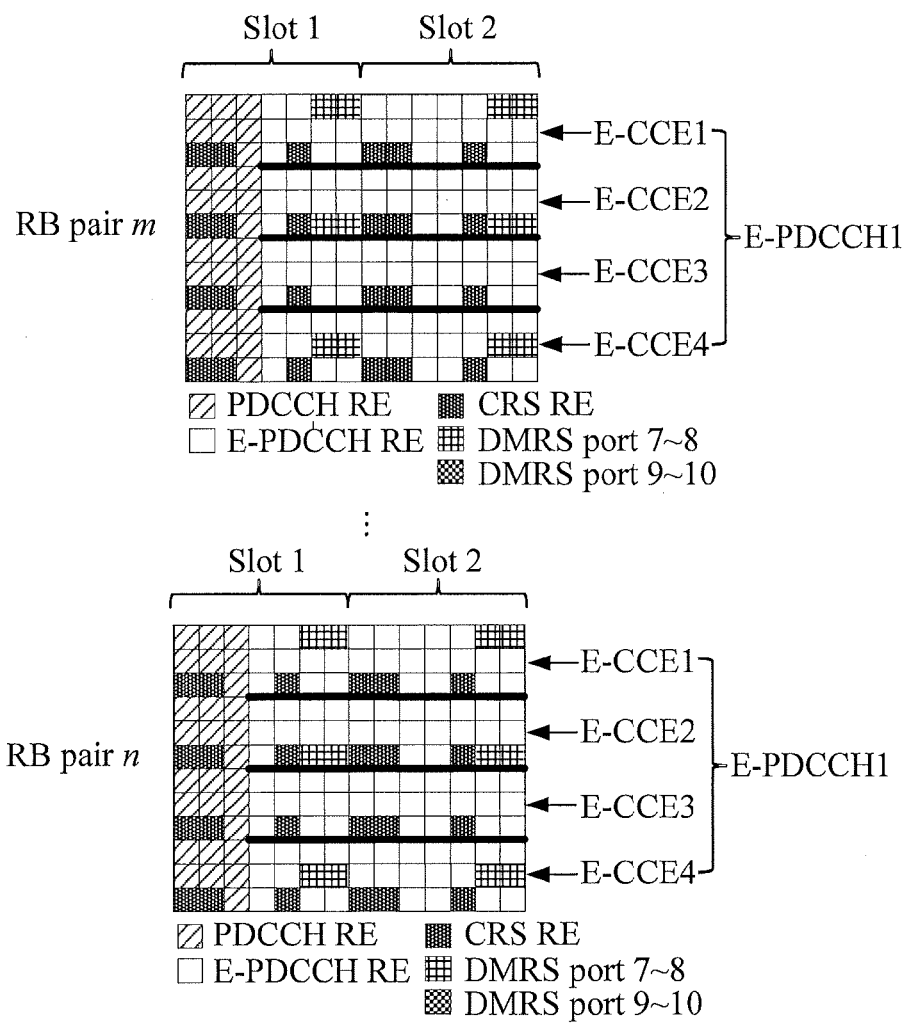
FIG. 6 shows a fifth schematic diagram of pilot resource allocation according to an implementation manner of the present invention.

In some implementation manners, each E-CCE is transmitted by using one antenna port. When the aggregation level of the E-CCE is 8, the total number of E-CCEs in one resource block pair is 4, that is, when the total number of E-CCEs in one resource block pair is less than the aggregation level of the E-CCE, E-CCE1 to E-CCE4 in an RB pair m and an RB pair n need to be occupied (where the RB pair m and the RB pair n may be continuous or discrete in a frequency domain). It can be determined that the E-CCEs in the resource block pair only belong to one E-PDCCH, so it can be determined that the total number of antenna ports used by the resource block pair is 1. Assuming that the port port 7 is used, as shown in FIG. 6, the number of REs occupied by the ports port 7 to port 8 is 12, so it is determined that the number of REs to be allocated to the DMRS is 12.

In other implementation manners of the present invention, two E-CCEs are multiplexed in one RB pair, and each E-CCE is transmitted by using two antenna ports. The correspondence between the aggregation level of the E-CCE and the number of REs occupied by the DRMS in one RB pair is shown in Table 2.

TABLE 2

| Aggregation level | Number of REs |
|---|---|
| 1 | 24 |
| 2 | 12 |
| 4 | 12 |
| 8 | 12 |

Figure 7:
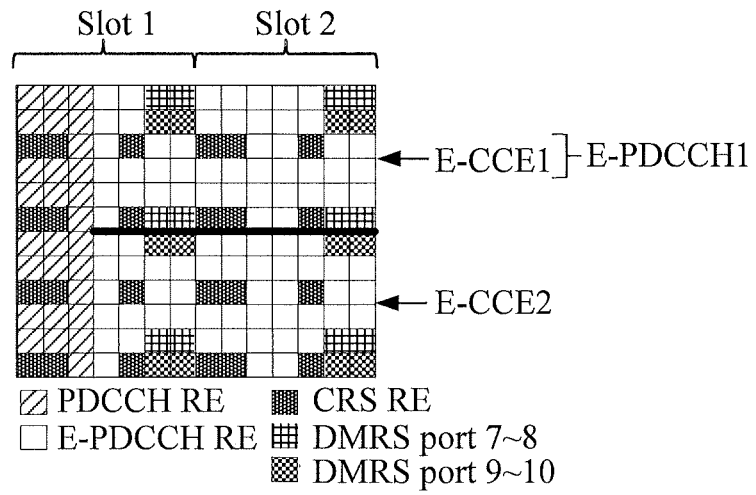
FIG. 7 shows a sixth schematic diagram of pilot resource allocation according to an implementation manner of the present invention.

In some implementation manners, when the aggregation level of the E-CCE is 1, assuming that E-CCE1 in one resource block pair is occupied, the ports port 7 to port 8 are used, as shown in FIG. 7. During receiving, the user equipment cannot determine whether another E-PDCCH is transmitted by E-CCE2, and assumes that another E-PDCCH is transmitted, the other E-PDCCH also needs to use two ports, so the total number of ports used in one resource block pair is 4. Assuming that ports port 7 to port 10 are used, the number of REs occupied by the ports port 7 to port 10 is 24, so it is determined that the number of REs to be allocated to the DMRS is 24.

Figure 8:
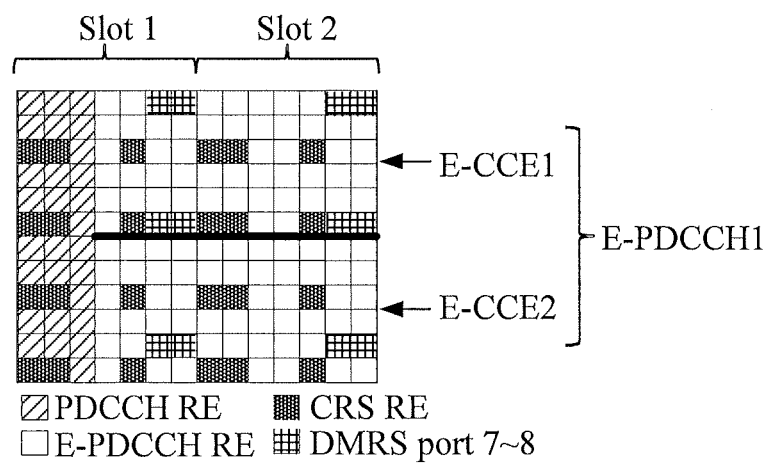
FIG. 8 shows a seventh schematic diagram of pilot resource allocation according to an implementation manner of the present invention.

In some implementation manners, two E-CCEs are multiplexed in one RB, and each E-CCE is transmitted by using two antenna ports. When the aggregation level of the E-CCE is 2 or 4 or 8, it can be determined that two E-CCEs in the resource block pair are occupied by the same E-PDCCH. Assuming that the ports port 7 to port 8 are used, as shown in FIG. 8, the number of REs occupied by the ports port 7 to port 8 is 12, so it is determined that the number of REs to be allocated to the DMRS is 12.

In some implementation manners of the present invention, if each E-CCE is transmitted by using one antenna port, and for a first aggregation level of the E-CCE, if all the E-CCEs in the resource block pair are occupied by one enhanced physical downlink control channel E-PDCCH, rate matching is performed on the E-PDCCH according to that the number of REs that are allocated to and occupied by the DMRS in the resource block pair is 12; otherwise, rate matching is performed on the E-PDCCH according to that the number of REs that are allocated to and occupied by the DMRS in the resource block pair is 24. It should be noted that, in the allocation method of the present invention, the UE and the eNB use the same RE resource allocation method. That is to say, for a certain RB pair, when the eNB transmits the E-PDCCH, the number of REs allocated for performing rate matching on the E-PDCCH is the same as the number of REs allocated in the RB pair during UE detection for performing rate de-matching on the E-PDCCH. The number of E-CCEs in the RB pair may be, for example, 4, 3, 2 and 1. Definitely, persons of ordinary skill in the art may also set another number of E-CCEs according to an application requirement; and the first aggregation level of the E-CCE may be any aggregation level corresponding to the number of E-CCEs in the RB pair. For example, if the number of E-CCEs in the RB pair is 4, a corresponding first aggregation level may be 4 or an aggregation level higher than 4 (for example, aggregation level 8). It should be pointed out that, a situation considered in the present invention mostly is starting occupation from the first E-CCE in the RB pair, and correspondence between the E-PDCCH and the E-CCE conforms to the foregoing set conditions or assumed situations. In an actual application scenario, for example, in FIG. 3, one E-PDCCH is sent in one RB pair by using E-CCE1 of an aggregation level 1, port 7 is used, and no E-PDCCH is sent on E-CCE2 to E-CCE4. According to the foregoing method, 24 REs should be allocated for performing rate matching on the E-PDCCH. That is to say, 24 REs are allocated on an eNB side. However, since the DMRS only occupies port 7, REs actually occupied by the DMRS are 12.

Figure 11:
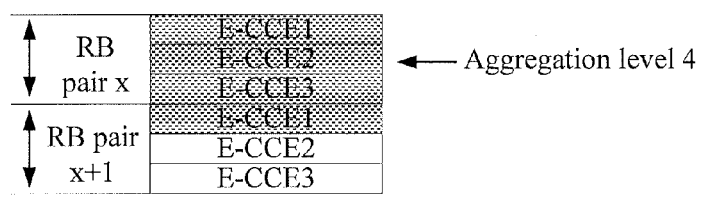
FIG. 11 shows an eighth schematic diagram of pilot resource allocation according to an implementation manner of the present invention.
Figure 12:
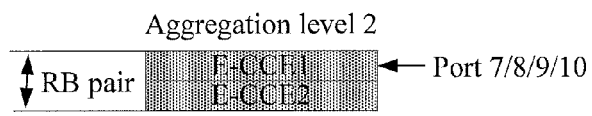
FIG. 12 shows a ninth schematic diagram of pilot resource allocation according to an implementation manner of the present invention.

For example, as shown in FIG. 11, when each E-CCE is transmitted by using one antenna port, and the total number of E-CCEs in the RB pair is 3, and if the aggregation level of the E-CCE is 4, three E-CCEs, namely, E-CCE1 to E-CCE3, are occupied in an RB pair x, where x is only used for identifying the RB pair. Similarly, another symbol may also be used for identifying; E-CCE1 in an RB pair x+1 is occupied, where the RB pair x and the RB pair x+1 may be continuous or discrete in a frequency domain. The number of REs allocated to the DMRS in the RB pair x is 12. According to that the DMRS is 12 REs, rate matching is performed on the E-PDCCH; and in a scenario where no other conditions clearly indicate the resource allocation in the RB pair x+1, the number of REs allocated to the DMRS in the RB pair x+1 may be 24. For another example, if the aggregation level of the E-CCE of the E-PDCCH control channel is 8, the total number of E-CCEs in one RB pair is 3, and the control channel occupies three RB pairs. In two RB pairs among the 3 RB pairs, three E-CCEs are occupied, and in the other RB pair, two E-CCEs are occupied. In the RB pairs that three E-CCEs are occupied (namely, all the E-CCEs of the RB pair are occupied by one E-PDCCH), the number of REs allocated to the DMRS is 12, and at the same time, in the two RB pairs, rate matching is performed on the E-PDCCH according to 12 DMRS REs. In the RB pair where two E-CCEs are occupied, rate matching may be performed on the E-PDCCH according to 24 DMRS REs. For another example, as shown in FIG. 12, the total number of E-CCEs in one RB pair is 2, labeled as E-CCE1 and E-CCE2. When the aggregation level of the E-CCE is 2, two E-CCEs in the RB pair are just occupied, which may be transmitted by using any one of ports (port) 7/8/9/10. The number of REs allocated to the DMRS is 12, and rate matching is performed on the E-PDCCH according to 12 DMRS REs. If the aggregation level of the E-CCE is 4, one E-PDCCH just occupies two RB pairs. In the two RB pairs, the number of REs allocated to the DMRS is 12, and at the same time, in the two RB pairs, rate matching is performed on the E-PDCCH according to 12 DMRS REs; and if the aggregation level of the E-CCE is 8, an EPDCCH just occupies four RB pairs, in the four RB pairs, the number of REs allocated to the DMRS is 12, and at the same time, in the four RB pairs, rate matching is performed on the E-PDCCH according to 12 DMRS REs.

In some implementation manners of the present invention, if each E-CCE in the RB pair is transmitted by using one antenna port, and for a second aggregation level of the E-CCE, if the number (namely, n−1) of E-CCEs that are in the resource block pair and occupied by one E-PDCCH is one less than the total number n of the E-CCEs in resource block pair, and the one remaining E-CCE in the resource block pair is transmitted by using a different antenna port in the same time-frequency resource of the antenna port, rate matching is performed on the E-PDCCH according to that the number of REs that are allocated to and occupied by the DMRS in the resource block pair is 12; otherwise, rate matching is performed on the E-PDCCH according to that the number of REs that are allocated to and occupied by the DMRS in the resource block pair is 24. In other words, the (n−1) E-CCEs in the RB pair are occupied by one E-PDCCH, and the one remaining E-CCE is transmitted by using a different antenna port of the same time-frequency resource used by the antenna port. When the foregoing two conditions are satisfied, 12 REs are allocated to the DMRS in the RB pair. In a situation other than the foregoing conditions, rate matching is performed on the E-PDCCH according to that the number of REs that are allocated to and occupied by the DMRS is 24, where n is the number of E-CCEs in the RB pair may be, for example, 4, 3, 2 and 1. Definitely, persons of ordinary skill in the art may also set another number of E-CCEs according to an application requirement; and the second aggregation level of the E-CCE may be any aggregation level corresponding to the number of E-CCEs in the RB pair. For example, if the number of E-CCEs in the RB pair is 3, a corresponding second aggregation level may be 2.

Figure 13:
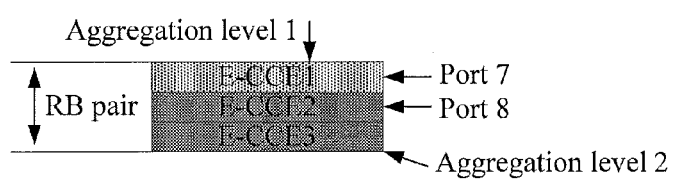
FIG. 13 shows a tenth schematic diagram of pilot resource allocation according to an implementation manner of the present invention.
Figure 14:
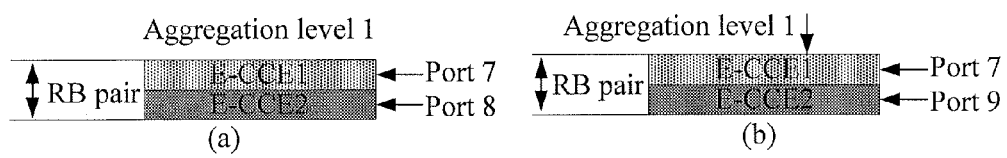
FIG. 14 shows an eleventh schematic diagram of pilot resource allocation according to an implementation manner of the present invention.

For example, as shown in FIG. 13, the total number of E-CCEs in one RB pair is 3. For an aggregation level 2, E-CCE2 and E-CCE3 are occupied, for example, port 8 (port8) is used for transmission. According to a binding relationship between the E-CCE and the DMRS, the binding relationship between the E-CCE and the DMRS refers to that a DMRS port used by an E-PDCCH control channel in one RB is related to a serial number of an occupied E-CCE. As shown in FIG. 3, it can be regarded that E-CCE1 is bound with DMRS port 7, E-CCE2 is bound with DMRS port 8, E-CCE3 is bound with DMRS port 9 and E-CCE4 is bound with DMRS port 10. When the aggregation level is 2, and when the E-PDCCH occupies E-CCE1, DMRS port 7 is used; when the E-PDCCH occupies E-CCE2, DMRS port 8 is used; when the E-PDCCH occupies E-CCE3, DMRS port 9 is used; and when the E-PDCCH occupies E-CCE4, DMRS port 10 is used. When the aggregation level is 2, and when the E-PDCCH occupies E-CCE1 and E-CCE2, DMRS port 7 is used; and when the E-PDCCH occupies E-CCE3 and E-CCE4, DMRS port 9 is used. When the aggregation level is 4 and 8, DMRS port 7 is used, that is, in one RB pair, each E-CCE is bound with one DMRS port, and a DMRS port used by the E-PDCCH in the RB pair is the same as a DMRS port bound with a first E-CCE occupied by the E-PDCCH. E-CCE1 in the RB pair definitely uses port 7 (port7). Because port 7 and port 8 are different ports that use the same time-frequency resource, the number of REs allocated to the DMRS in the RB pair is 12, and rate matching is performed on the E-PDCCH according to that the DMRS is allocated 12 REs. For another example, as shown in FIG. 14(*a*), the total number of E-CCEs in one RB pair is 2. When the aggregation level of the E-CCE is 1, E-CCE1 is occupied, and port 7 (port7) is used for transmission. If E-CCE2 is transmitted by using a different port of the same time-frequency resource of port 7 (port7), namely, port 8 (port8), the number of REs that are allocated to and occupied by the DMRS in the RB pair is 12, and rate matching is performed according to that the DMRS is 12 REs. However, as shown in FIG. 14(*b*), if the E-CCE2 is transmitted by using port 9 (port9), because port 7 (port7) and port 9 (port9) use different time-frequency resources, the number of REs that are allocated to and occupied by the DMRS in the RB pair is 24.

In some implementation manners of the present invention, if each E-CCE is transmitted by using one antenna port, and for a first aggregation level of the E-CCE, if all the E-CCEs in the resource block pair are occupied by one enhanced physical downlink control channel E-PDCCH, or if each E-CCE is transmitted by using one antenna port, and for a second aggregation level of the E-CCE, if the number of E-CCEs that are in the resource block pair and occupied by one E-PDCCH is one less than the total number of the E-CCEs in resource block pair, and the one remaining E-CCE in the resource block pair is transmitted by using a different antenna port of the same time-frequency resource of the antenna port, rate matching is performed on the E-PDCCH according to that the number of REs that are allocated to and occupied by the DMRS in the resource block pair is 12; otherwise, rate matching is performed on the E-PDCCH according to that the number of REs that are allocated to and occupied by the DMRS in the resource block pair is 24. In other words, if either of the foregoing two conditions is satisfied, rate matching may be performed on the E-PDCCH according to that the number of REs that are allocated to and occupied by the DMRS is 12; otherwise, rate matching is performed on the E-PDCCH according to that the number of REs that are allocated to and occupied by the DMRS is 24.

Figure 9:
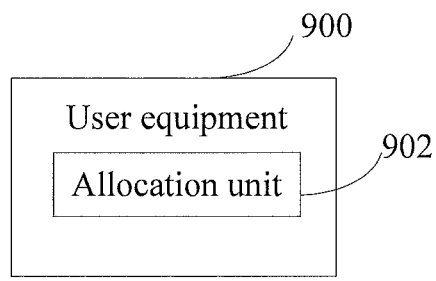
FIG. 9 shows a schematic structural diagram of a user equipment according to an implementation manner of the present invention.

Referring to FIG. 9, FIG. 9 shows a schematic structural diagram of a user equipment according to an implementation manner of the present invention, and the user equipment 900 includes:

an allocation unit 902, configured to determine, according to an aggregation level and multiplexing information of an enhanced control channel element E-CCE in a resource block pair, the number of resource elements REs that are allocated to and occupied by a demodulation pilot signal DMRS in the resource block pair.

In the implementation manner of the present invention, the allocation unit determines, according to the aggregation level and multiplexing information of the E-CCE in one resource block pair, the number of REs that are allocated to and occupied by the DMRS in the resource block pair, and establishes correspondence between the aggregation level of the E-CCE and the number of REs occupied by the DMRS, thereby reducing the idleness of an RE that is not used by the DMRS, and improving the efficiency of resource utilization. The allocation unit in the implementation manner of the present invention may be implemented by using a data processing device such as a processor.

In some implementation manners, each E-CCE is transmitted by using one antenna port port, the number of E-CCEs in one RB pair is 4, and reference may be made to FIG. 2 for specific resource allocation. When the aggregation level of the E-CCE is 1, assuming that the position of E-CCE1 in one RB pair is occupied, the UE cannot determine how many E-PDCCHs are transmitted in positions of the remaining E-CCEs, namely, E-CCE2 to E-CCE4, during receiving. The allocation unit assumes that the largest number of E-PDCCHs are transmitted, and the largest number is 3, that is, E-CCE2 to E-CCE4 belong to three different E-PDCCHs and need to be transmitted by using three ports. The total number of antenna ports used in the RB pair is 4. Assuming that ports port 7 to port 10 are used, as shown in FIG. 3, the number of REs occupied by the ports port 7 to port 10 is 24, so it is determined that the number of REs to be allocated to the DMRS is 24.

In some implementation manners, each E-CCE is transmitted by using one antenna port. When the aggregation level of the E-CCE is 2, assuming that positions of E-CCE1 to E-CCE2 in one RB pair are occupied, as shown in FIG. 4. During receiving, the user equipment cannot determine whether positions of the remaining E-CCE3 to E-CCE4 transmit one or two E-PDCCHs. The allocation unit assumes that two E-PDCCHs are transmitted at most, so it is determined that the total number of antenna ports used in the resource block pair is 3. Assuming that ports port 7 to port 9 are used, the number of REs occupied by the ports port 7 to port 9 is 24, so it is determined that the number of REs to be allocated to the DMRS is 24.

In some implementation manners, each E-CCE is transmitted by using one antenna port. When the aggregation level of the E-CCE is 4, assuming that E-CCE1 to E-CCE4 in one RB pair are occupied, as shown in FIG. 5. In this case, the allocation unit determines that the total number of E-CCEs in the resource block pair is equal to the aggregation level of the E-CCE, and the total number of antenna ports used by the resource block pair is 1. Assuming that the port port 7 is used, the number of REs occupied by ports port 7 to port 8 is 12, so it is determined that the number of REs to be allocated to the DMRS is 12.

In some implementation manners, each E-CCE is transmitted by using one antenna port. When the aggregation level of the E-CCE is 8, the total number of E-CCEs in one resource block pair is 4, that is, when the total number of E-CCEs in one resource block pair is less than the aggregation level of the E-CCE, E-CCE1 to E-CCE4 in an RB pair m and an RB pair n need to be occupied (where the RB pair m and the RB pair n may be continuous or discrete in a frequency domain). It can be determined that the E-CCEs in the resource block pair only belong to one E-PDCCH, and the allocation unit may determine that the total number of antenna ports used by the resource block pair is 1. Assuming that the port port 7 is used, the number of REs occupied by the ports port 7 to port 8 is 12, so it is determined that the number of REs to be allocated to the DMRS is 12.

In other implementation manners of the present invention, two E-CCEs are multiplexed in one RB, and each E-CCE is transmitted by using two antenna ports. When the aggregation level of the E-CCE is 1, assuming that the E-CCE1 in a resource block pair is occupied, the ports port 7 to port 8 are used, as shown in FIG. 7. During receiving, the user equipment cannot determine whether other E-PDCCHs are transmitted by the E-CCE2. The allocation unit assumes other E-PDCCHs are transmitted by the E-CCE2, so the total number of ports used in one resource block pair is 4. Assuming that the ports port 7 to port 10 are used, the number of REs occupied by the ports port 7 to port 10 is 24, so it is determined that the number of REs to be allocated to the DMRS is 24.

In some implementation manners, two E-CCEs are multiplexed in one RB, and each E-CCE is transmitted by using two antenna ports. When the aggregation level of the E-CCE is 2 or 4 or 8, the allocation unit can determines that two E-CCEs in the resource block pair are occupied by the same E-PDCCH. Assuming that the ports port 7 to port 8 are used, the number of REs occupied by the ports port 7 to port 8 is 12, so it is determined that the number of REs to be allocated to the DMRS is 12.

In some implementation manners of the present invention, in one resource block pair (RB pair), each E-CCE is transmitted by using one antenna port. For a first aggregation level of the E-CCE, if all the E-CCEs in the RB pair are occupied by one E-PDCCH, the allocation unit performs rate de-matching on the E-PDCCH according to that the number of REs that are allocated to and occupied by the DMRS in the RB pair is 12; otherwise, the allocation unit performs rate de-matching on the E-PDCCH according to that the number of REs occupied the DMRS allocated in the RB pair is 24. The number of E-CCEs in the RB pair may be, for example, 4, 3, 2 and 1. Definitely, persons of ordinary skill in the art may also set another number of E-CCEs according to an application requirement, and the first aggregation level of the E-CCE may be any aggregation level corresponding to the number of E-CCEs in the RB pair. For example, if the number of E-CCEs in the RB pair is 4, a corresponding first aggregation level may be 4 or an aggregation level higher than 4 (for example, aggregation level 8).

It should be noted that, a situation considered in the present invention mostly is starting occupation from the first E-CCE in the RB pair.

For example, as shown in FIG. 11, when each E-CCE is transmitted by using one antenna port, and the total number of E-CCEs in the RB pair is 3, and if the aggregation level of the E-CCE is 4, three E-CCEs, namely, E-CCE1 to E-CCE3, are occupied in an RB pair x, where x is only used for identifying the RB pair. Similarly, another symbol may further be used for identifying; the E-CCE1 is occupied in an RB pair x+1, where the RB pair x and the RB pair x+1 may be continuous or discrete in a frequency domain. The number of REs allocated to the DMRS by the allocation unit in the RB pair x is 12. According to that the DMRS is 12 REs, rate de-matching is performed on the E-PDCCH; and in a scenario where no other conditions clearly indicate resource allocation in the RB pair x+1, the number of REs allocated to the DMRS in the RB pair x+1 may be 24.

In some implementation manners of the present invention, if each E-CCE in the RB pair is transmitted by using one antenna port, and for a second aggregation level of the E-CCE, if the number (namely, n−1) of E-CCEs that are in the resource block pair and occupied by one E-PDCCH is one less than the total number n of the E-CCEs in resource block pair, and one remaining E-CCE in the resource block pair is transmitted by using a different antenna port in the same time-frequency resource of the antenna port, the allocation unit performs rate de-matching on the E-PDCCH according to that the number of REs that are allocated to and occupied by the DMRS in the resource block pair is 12; otherwise, the allocation unit performs rate de-matching according to that the number of REs that are allocated to and occupied by the DMRS in the resource block pair is 24, where n is the number of E-CCEs in the RB pair may be, for example, 4, 3, 2 and 1. Definitely, persons of ordinary skill in the art may also set another number of E-CCEs according to an application requirement; and the second aggregation level of the E-CCE may be any aggregation level corresponding to the number of E-CCEs in the RB pair. For example, if the number of E-CCEs in the RB pair is 3, a corresponding second aggregation level may be 2.

For example, as shown in FIG. 13, the total number of E-CCEs in one RB pair is 3. For an aggregation level 2, E-CCE2 and E-CCE3 are occupied, for example, port 8 (port8) is used for transmission. According to a binding relationship between the E-CCE and the DMRS, E-CCE1 in the RB pair definitely uses port 7 (port7). Because port 7 and port 8 are different ports that use the same time-frequency resource, the number of REs allocated to the DMRS by the allocation unit in the RB pair is 12, and rate de-matching is performed on the E-PDCCH according to that the DMRS is 12 REs. For another example, as shown in FIG. 14(a), the total number of E-CCEs in one RB pair is 2. When the aggregation level of the E-CCE is 1, E-CCE1 is occupied, and port 7 (port7) is used for transmission. If E-CCE2 is transmitted by using a different port of the same time-frequency resource of port 7 (port7), namely, port 8 (port8), the number of REs that are allocated by the allocation unit to and occupied by the DMRS in the RB pair is 12, and rate de-matching is performed according to that the DMRS is 12 REs. However, as shown in FIG. 14(b), if the E-CCE2 is transmitted by using port 9 (port9), because port 7 (port7) and port 9 (port9) use different time-frequency resources, the number of REs that are allocated by the allocation unit to and occupied by the DMRS in the RB pair is 24.

In some implementation manners of the present invention, if each E-CCE is transmitted by using one antenna port, and for a first aggregation level of the E-CCE, if all the E-CCEs in the resource block pair are occupied by one enhanced physical downlink control channel E-PDCCH, or if each E-CCE is transmitted by using one antenna port, and for a second aggregation level of the E-CCE, if the number of E-CCEs occupied by one E-PDCCH is one less than the total number of E-CCEs in the resource block pair, and the one remaining E-CCE in the resource block pair is transmitted by using a different antenna port of the same time-frequency resource of the antenna port, the allocation unit performs rate matching on the E-PDCCH according to that the number of REs that are allocated to and occupied by the DMRS in the resource block pair is 12; otherwise, the allocation unit performs rate matching on the E-PDCCH according to that the number of REs that are allocated to and occupied by the DMRS in the resource block pair is 24. In other words, if either of the foregoing two conditions is satisfied, rate de-matching may be performed on the E-PDCCH according to that the number of REs that are allocated to and occupied by the DMRS is 12; otherwise, rate de-matching is performed on the E-PDCCH according to that the number of REs that are allocated to and occupied by the DMRS is 24.

Figure 10:
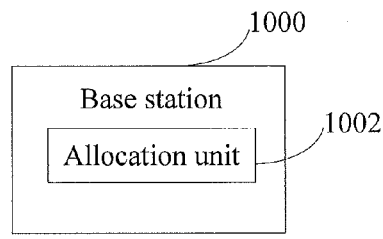
FIG. 10 shows a schematic structural diagram of a base station according to an implementation manner of the present invention.

Referring to FIG. 10, FIG. 10 shows a schematic structural diagram of a base station according to an implementation manner of the present invention, and the base station 1000 includes:

an allocation unit 1002, configured to determine, according to an aggregation level and multiplexing information of an enhanced control channel element E-CCE in a resource block pair, the number of resource elements REs that are allocated to and occupied by a demodulation pilot signal DMRS in the resource block pair.

In the implementation manner of the present invention, the allocation unit determines, according to the aggregation level and multiplexing information of the E-CCE in one resource block pair, the number of REs that are allocated to and occupied by the DMRS in the resource block pair, and establishes correspondence between the aggregation level of the E-CCE and the number of REs occupied by the DMRS, thereby reducing the idleness of an RE that is not used by the DMRS, and improving the efficiency of resource utilization. The allocation unit in the implementation manner of the present invention may be implemented by using a data processing device such as a processor.

In some implementation manners, each E-CCE is transmitted by using one antenna port port, the number of E-CCEs in one RB pair is 4, and reference may be made to FIG. 2 for specific resource allocation. When the aggregation level of the E-CCE is 1, assuming that the position of E-CCE1 in one RB pair is occupied, but it cannot be determined that how many E-PDCCHs are transmitted in positions of the remaining E-CCEs, namely, E-CCE2 to E-CCE4. The allocation unit assumes that the largest number of E-PDCCHs are transmitted, and the largest number is 3, that is, E-CCE2 to E-CCE4 belong to three different E-PDCCHs and need to be transmitted by using three ports. The total number of antenna ports used in the RB pair is 4. Assuming that ports port 7 to port 10 are used, as shown in FIG. 3, the number of REs occupied by the ports port 7 to port 10 is 24, so it is determined that the number of REs to be allocated to the DMRS is 24.

In some implementation manners, each E-CCE is transmitted by using one antenna port. When the aggregation level of the E-CCE is 2, assuming that positions of E-CCE1 to E-CCE2 in one RB pair are occupied, as shown in FIG. 4, but it cannot be determined whether one or two E-PDCCHs are transmitted in positions of the remaining E-CCE3 to E-CCE4. The allocation unit assumes that the transmitted E-PDCCHs is at most two, so it is determined that the total number of antenna ports used in the resource block pair is 3. Assuming that ports port 7 to port 9 are used, the number of REs occupied by the ports port 7 to port 9 is 24, so it is determined that the number of REs to be allocated to the DMRS is 24.

In some implementation manners, each E-CCE is transmitted by using one antenna port. When the aggregation level of the E-CCE is 4, assuming that E-CCE1 to E-CCE4 in one RB pair are occupied, as shown in FIG. 5. In this case, the allocation unit determines that the total number of E-CCEs in the resource block pair is equal to the aggregation level of the E-CCE, and the total number of antenna ports used by the resource block pair is 1. Assuming that a port port 7 is used, the number of REs occupied by ports port 7 to port 8 is 12, so it is determined that the number of REs to be allocated to the DMRS is 12.

In some implementation manners, each E-CCE is transmitted by using one antenna port. When the aggregation level of the E-CCE is 8, the total number of E-CCEs in one resource block pair is 4, that is, when the total number of E-CCEs in one resource block pair is less than the aggregation level of the E-CCE, E-CCE1 to E-CCE4 in an RB pair m and an RB pair n need to be occupied (where the RB pair m and the RB pair n may be continuous or discrete in a frequency domain). It can be determined that the E-CCEs in the resource block pair only belong to one E-PDCCH, and the allocation unit can determine that the total number of antenna ports used by the resource block pair is 1. Assuming that the port port 7 is used, the number of REs occupied by the ports port 7 to port 8 is 12, so it is determined that the number of REs to be allocated to the DMRS is 12.

In other implementation manners of the present invention, two E-CCEs are multiplexed in one RB, and each E-CCE is transmitted by using two antenna ports. When the aggregation level of the E-CCE is 1, assuming that the E-CCE1 in one resource block pair is occupied, the ports port 7 to port 8 are used, but it cannot be determined whether other E-PDCCHs are transmitted by the E-CCE2. The allocation unit assumes other E-PDCCHs are transmitted, so the total number of ports used in the resource block pair is 4. Assuming that the ports port 7 to port 10 are used, the number of REs occupied by the ports port 7 to port 10 is 24, so it is determined that the number of REs to be allocated to the DMRS is 24.

In some implementation manners, two E-CCEs are multiplexed in one RB, and each E-CCE is transmitted by using two antenna ports. When the aggregation level of the E-CCE is 2 or 4 or 8, the allocation unit that two E-CCEs in the resource block pair are occupied by the same E-PDCCH. Assuming that the ports port 7 to port 8 are used, the number of REs occupied by the ports port 7 to port 8 is 12, so it is determined that the number of REs to be allocated to the DMRS is 12.

In some implementation manners of the present invention, in one resource block pair (RB pair), each E-CCE is transmitted by using one antenna port. For a first aggregation level of the E-CCE, if all the E-CCEs in the RB pair are occupied by one E-PDCCH, the allocation unit performs rate matching on the E-PDCCH according to that the number of REs that are allocated to and occupied by the DMRS in the resource block pair is 12; otherwise, the allocation unit performs rate matching on the E-PDCCH according to that the number of REs that are allocated to and occupied by the DMRS in the resource block pair is 24. The number of E-CCEs in the RB pair may be, for example, 4, 3, 2 and 1. Definitely, persons of ordinary skill in the art may also set another number of E-CCEs according to an application requirement, and the first aggregation level of the E-CCE may be any aggregation level corresponding to the number of E-CCEs in the RB pair. For example, if the number of E-CCEs in the RB pair is 4, a corresponding first aggregation level may be 4 or an aggregation level higher than 4 (for example, aggregation level 8). It should be noted that, the situation considered in the present invention mostly is starting occupation from the first E-CCE in the RB pair.

For example, as shown in FIG. 11, each E-CCE is transmitted by using one antenna port. When the total number of E-CCEs in the RB pair is 3, if the aggregation level of the E-CCE is 4, three E-CCEs, namely, E-CCE1 to E-CCE3, are occupied in an RB pair x, where x is only used for identifying the RB pair. Similarly, another symbol may further be used for identifying; the E-CCE1 is occupied in an RB pair x+1, where the RB pair x and the RB pair x+1 may be continuous or discrete in a frequency domain. The number of REs allocated to the DMRS by the allocation unit in the RB pair x is 12. According to that the DMRS is 12 REs, rate matching is performed on the E-PDCCH; and in a scenario where no other conditions clearly indicate resource allocation in the RB pair x+1, the number of REs allocated to the DMRS in the RB pair x+1 may be 24.

In some implementation manners of the present invention, if each E-CCE in the RB pair is transmitted by using one antenna port, and for a second aggregation level of the E-CCE, if the number (namely, n−1) of E-CCEs that are in the resource block pair and occupied by one E-PDCCH is one less than the total number n of the E-CCEs in resource block pair, and one remaining E-CCE in the resource block pair is transmitted by using a different antenna port in the same time-frequency resource of the antenna port, the allocation unit performs rate matching on the E-PDCCH according to that the number of REs that are allocated to and occupied by the DMRS in the resource block pair is 12; otherwise, the allocation unit performs rate matching on the E-PDCCH according to that the number of REs that are allocated to and occupied by the DMRS in the resource block pair is 24, where n is the number of E-CCEs in the RB pair may be, for example, 4, 3, 2 and 1. Definitely, persons of ordinary skill in the art may also set another number of E-CCEs according to an application requirement; and the second aggregation level of the E-CCE may be any aggregation level corresponding to the number of E-CCEs in the RB pair. For example, if the number of E-CCEs in the RB pair is 3, a corresponding second aggregation level may be 2.

For example, as shown in FIG. 13, the total number of E-CCEs in one RB pair is 3. For an aggregation level 2, E-CCE2 and E-CCE3 are occupied, for example, port 8 (port8) is used for transmission. According to a binding relationship between the E-CCE and the DMRS, E-CCE1 in the RB pair definitely uses port 7 (port7). Because port 7 and port 8 are different ports that use the same time-frequency resource, the number of REs allocated to the DMRS by the allocation unit in the RB pair is 12, and rate matching is performed on the E-PDCCH according to that the DMRS is 12 REs. For another example, as shown in FIG. 14(*a*), the total number of E-CCEs in one RB pair is 2. When the aggregation level of the E-CCE is 1, E-CCE1 is occupied, and port 7 (port7) is used for transmission. If E-CCE2 is transmitted by using a different port of the same time-frequency resource of port 7 (port7), namely, port 8 (port8), the number of REs that are allocated by the allocation unit to and occupied by the DMRS in the RB pair is 12, and rate matching is performed according to that the DMRS is 12 REs. However, as shown in FIG. 14(b), if the E-CCE2 is transmitted by using port 9 (port9), because port 7 (port7) and port 9 (port9) use different time-frequency resources, the number of REs that are allocated by the allocation unit to and occupied by the DMRS in the RB pair is 24.

In some implementation manners of the present invention, if each E-CCE is transmitted by using one antenna port, and for a first aggregation level of the E-CCE, if all the E-CCEs in the resource block pair are occupied by one enhanced physical downlink control channel E-PDCCH, or if each E-CCE is transmitted by using one antenna port, and for a second aggregation level of the E-CCE, if the number of E-CCEs that are in the resource block pair and occupied by one E-PDCCH is one less than the total number of the E-CCEs in resource block pair, and the one remaining E-CCE in the resource block pair is transmitted by using a different antenna port of the same time-frequency resource of the antenna port, the allocation unit performs rate matching on the E-PDCCH according to that the number of REs that are allocated to and occupied by the DMRS in the resource block pair is 12; otherwise, the allocation unit performs rate matching on the E-PDCCH according to that the number of REs that are allocated to and occupied by the DMRS in the resource block pair is 24. In other words, if either of the foregoing two conditions is satisfied, the allocation unit may perform rate matching on the E-PDCCH according to that the number of REs that are allocated to and occupied by the DMRS is 12; otherwise, rate matching is performed on the E-PDCCH according to that the number of REs that are allocated to and occupied by the DMRS is 24.

Person of ordinary skill in the art may understand that all or part of procedures of the methods in the embodiments may be implemented by a computer program instructing relevant hardware. The program may be stored in a computer readable storage medium. When the program is run, the procedures of the methods in the embodiments are performed. The storage medium may be a magnetic disk, an optical disk, a read-only memory (Read-Only Memory, ROM), a random access memory (Random Access Memory, RAM) or the like.

The foregoing disclosed descriptions are merely exemplary embodiments of the present invention, but are not intended to limit the scope of the present invention. Therefore, equivalent variations made according to the claims of the present invention shall fall within the protection scope of the present invention.

What is claimed is:

1. A pilot resource allocation method, comprising:
by a base station or a user equipment operable in a communication system:
determining, according to an aggregation level and multiplexing information of an enhanced control channel element (E-CCE) in a resource block pair of the communication system, a number of resource elements (REs) of the communication system that are to be allocated to and occupied by a demodulation pilot signal (DMRS) of the communication system in the resource block pair; and
performing resource allocation in the communication system by establishing correspondence between the aggregation level of the E-CCE and the determined number of REs.

2. The method according to claim 1, wherein:
if each E-CCE is transmitted by using one antenna port, the determining determines the number of REs that are to be allocated to and occupied by the DMRS in the resource block pair according to the aggregation level of the E-CCE and a total number of E-CCEs in the resource block pair.

3. The method according to claim 1, wherein:
if each E-CCE is transmitted by using one antenna port, and a total number of E-CCEs in the resource block pair is 4, the correspondence between the aggregation level of the E-CCE and the determined number of REs is established so that, when the aggregation level of the E-CCE is 1, 2, 4 and 8, the number of REs that are allocated to and occupied by the DMRS in the resource block pair is 24, 24, 12 and 12, respectively.

4. The method according to claim 1, wherein:
if each E-CCE is transmitted by using two antenna ports, the determining determines the number of REs that are to be allocated to and occupied by the DMRS in the resource block pair according to the aggregation level of the E-CCE and a number of E-CCEs multiplexed in the resource block pair.

5. The method according to claim 1, wherein:
if each E-CCE is transmitted by using two antenna ports, and a number of E-CCEs multiplexed in the resource block pair is 2, the correspondence between the aggregation level of the E-CCE and the determined number of REs is established so that, when the aggregation level of the E-CCE is 1, 2, 4 and 8, the number of REs that are allocated to and occupied by the DMRS in the resource block pair is 24, 12, 12 and 12, respectively.

6. The method according to claim 1, comprising:
if each E-CCE is transmitted by using one antenna port, and for a first aggregation level of the E-CCE, if all E-CCEs in the resource block pair are occupied by one enhanced physical downlink control channel (E-PDCCH), performing rate matching on the E-PDCCH according to that the number of REs that are allocated to and occupied by the DMRS in the resource block pair being 12; otherwise, performing rate matching on the E-PDCCH according to the number of REs that are allocated to and occupied by the DMRS in the resource block pair being 24.

7. A user equipment, comprising:
at least one memory storing computer-readable instructions; and
at least one processor executing the instructions to provide:
an allocation unit, configured to
determine, according to an aggregation level and multiplexing information of an enhanced control channel element (E-CCE) in a resource block pair of a communication system in which the user equipment is operable, a number of resource elements (REs) of the communication system that are to be allocated to and occupied by a demodulation pilot signal (DMRS) of the communication system in the resource block pair, and
performing resource allocation in the communication system by establishing correspondence between the aggregation level of the E-CCE and the determined number of REs.

8. The user equipment according to claim 7, wherein the allocation unit is configured to, if each E-CCE is transmitted by using one antenna port, determine the number of REs that are to be allocated to and occupied by the DMRS in the resource block pair according to the aggregation level of the E-CCE and a total number of E CCEs in the resource block pair.

9. The user equipment according to claim 7, wherein the allocation unit is configured to, if each E-CCE is transmitted by using one antenna port, and a total number of E-CCEs in the resource block pair is 4, establish correspondence between the aggregation level of the E-CCE and the number of REs that are to be allocated to and occupied by the DMRS in the resource block pair so that, when the aggregation level of the E-CCE is 1, 2, 4 and 8, the number of REs that are allocated to and occupied by the DMRS in the resource block pair is 24, 24, 12 and 12, respectively.

10. The user equipment according to claim 7, wherein the allocation unit is configured to, if each E-CCE is transmitted by using two antenna ports, determine the number of REs that are to be allocated to and occupied by the DMRS in the resource block pair according to the aggregation level of the E-CCE and a number of E-CCEs multiplexed in the resource block pair.

11. The user equipment according to claim 7, wherein the allocation unit is configured to, if each E-CCE is transmitted by using two antenna ports, and a number of E-CCEs multiplexed in the resource block pair is 2, establish correspondence between the aggregation level of the E-CCE and the number of REs that are to be allocated to and occupied by the DMRS in the resource block pair so that, when the aggregation level of the E-CCE is 1, 2, 4 and 8, the number of REs that are allocated to and occupied by the DMRS in the resource block pair is 24, 12, 12 and 12.

12. The user equipment according to claim 7, wherein the allocation unit is configured to, if each E-CCE is transmitted by using one antenna port, and for a first aggregation level of the E-CCE, if all E-CCEs in the resource block pair are occupied by one enhanced physical downlink control channel (E-PDCCH), perform rate de-matching on the E-PDCCH according to the number of REs that are allocated to and occupied by the DMRS in the resource block pair being 12; otherwise, perform rate de-matching on the E-PDCCH according to that the number of REs that are allocated to and occupied by the DMRS in the resource block pair being 24.

13. A base station, comprising:
at least one memory storing computer-readable instructions; and
at least one processor executing the instructions to provide:
an allocation unit, configured to
determine, according to an aggregation level and multiplexing information of an enhanced control channel element (E-CCE) in a resource block pair of a communication system in which the base station is operable, a number of resource elements (REs) of the communication system that are to be allocated to and occupied by a demodulation pilot signal (DMRS) of the communication system in the resource block pair, and
performing resource allocation in the communication system by establishing correspondence between the aggregation level of the E-CCE and the determined number of REs.

14. The base station according to claim 13, wherein the allocation unit is configured to, if each E-CCE is transmitted by using one antenna port, determine the number of REs that are to be allocated to and occupied by the DMRS in the resource block pair according to the aggregation level of the E-CCE and a total number of E-CCEs in the resource block pair.

15. The base station according to claim 13, wherein the allocation unit is configured to, if each E-CCE is transmitted by using one antenna port, and a total number of E-CCEs in the resource block pair is 4, establish correspondence between the aggregation level of the E-CCE and the number of REs that are to be allocated to and occupied by the DMRS in the resource block pair so that, when the aggregation level of the E-CCE is 1, 2, 4 and 8, the number of REs that are allocated to and occupied by the DMRS in the resource block pair is 24, 24, 12 and 12.

16. The base station according to claim 13, wherein the allocation unit is configured to, if each E-CCE is transmitted by using two antenna ports, determine the number of REs that are to be allocated to and occupied by the DMRS in the resource block pair according to the aggregation level of the E-CCE and a number of E-CCEs multiplexed in the resource block pair.

17. The base station according to claim 13, wherein the allocation unit is configured to, if each E-CCE is transmitted by using two antenna ports, and a number of E-CCEs multiplexed in the resource block pair is 2, establish correspondence between the aggregation level of the E-CCE and the number of REs that are to be allocated to and occupied by the DMRS in the resource block pair so that, when the aggregation level of the E-CCE is 1, 2, 4 and 8, the number of REs that are allocated to and occupied by the DMRS in the resource block pair is 24, 12, 12 and 12.

18. The base station according to claim 13, wherein the allocation unit is configured to, if each E-CCE is transmitted by using one antenna port, and for a first aggregation level of the E-CCE, if all E-CCEs in the resource block pair are occupied by one enhanced physical downlink control channel (E-PDCCH), perform rate matching on the E-PDCCH according to the number of REs that are allocated to and occupied by the DMRS in the resource block pair being 12; otherwise, perform rate matching on the E-PDCCH according to the number of REs that are allocated to and occupied by the DMRS in the resource block pair being 24.

* * * * *